United States Patent
Kakuta et al.

(10) Patent No.: US 7,103,897 B2
(45) Date of Patent: Sep. 5, 2006

(54) OPTICAL INFORMATION RECORDING MEDIUM

(75) Inventors: Takeshi Kakuta, Kanagawa (JP); Toshio Ishida, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 94 days.

(21) Appl. No.: 10/776,606

(22) Filed: Feb. 12, 2004

(65) Prior Publication Data

US 2004/0168182 A1   Aug. 26, 2004

(30) Foreign Application Priority Data

Feb. 13, 2003   (JP)   ............... 2003-034763

(51) Int. Cl.
    *G11B 7/24*   (2006.01)
(52) U.S. Cl. .................................... 720/718
(58) Field of Classification Search ............. None
    See application file for complete search history.

(56) References Cited

U.S. PATENT DOCUMENTS

| | | | | |
|---|---|---|---|---|
| 5,219,708 A | * | 6/1993 | Hirata et al. | 430/270.11 |
| 5,340,698 A | | 8/1994 | Hirata et al. | |
| 5,936,934 A | * | 8/1999 | Kuribayashi et al. | 369/286 |
| 6,037,099 A | * | 3/2000 | Oogo et al. | 430/270.11 |
| 6,087,067 A | * | 7/2000 | Kato et al. | 430/270.13 |
| 6,500,295 B1 | * | 12/2002 | Kubota | 156/269 |
| 6,500,511 B1 | * | 12/2002 | Ooki et al. | 428/64.1 |
| 6,599,602 B1 | * | 7/2003 | Bennett et al. | 428/64.1 |
| 6,815,035 B1 | * | 11/2004 | Bennett et al. | 428/65.1 |
| 2002/0127367 A1 | * | 9/2002 | Shibata | 428/64.4 |
| 2003/0184891 A1 | * | 10/2003 | Hosoi et al. | 359/883 |
| 2004/0038057 A1 | * | 2/2004 | Katoh et al. | 428/500 |
| 2004/0170119 A1 | * | 9/2004 | Watanabe | 369/286 |

FOREIGN PATENT DOCUMENTS

| | | | |
|---|---|---|---|
| JP | 403229783 A | * | 10/1991 |
| JP | 2000-067468 A | | 3/2000 |
| JP | 2000-285520 A | | 10/2000 |
| JP | 2002-503249 | * | 3/2002 |
| JP | 02002088325 A | * | 3/2002 |
| JP | 02002241711 A | * | 8/2002 |
| WO | WO 00/74937 A1 | | 12/2000 |

* cited by examiner

*Primary Examiner*—Allen Cao
(74) *Attorney, Agent, or Firm*—Sughrue Mion, PLLC

(57) ABSTRACT

An optical information recording medium including a substrate, a recording layer formed on the substrate, and a transparent sheet provided on the recording layer via an adhesive layer. The adhesive layer has a peak of loss modulus at a temperature of 0° C. or lower, and exhibits an E1'/E2' ratio of 2.0 or less, wherein E1' and E2' represent storage moduli of the adhesive layer at 25° C. and 80° C., respectively.

13 Claims, 1 Drawing Sheet

Figure
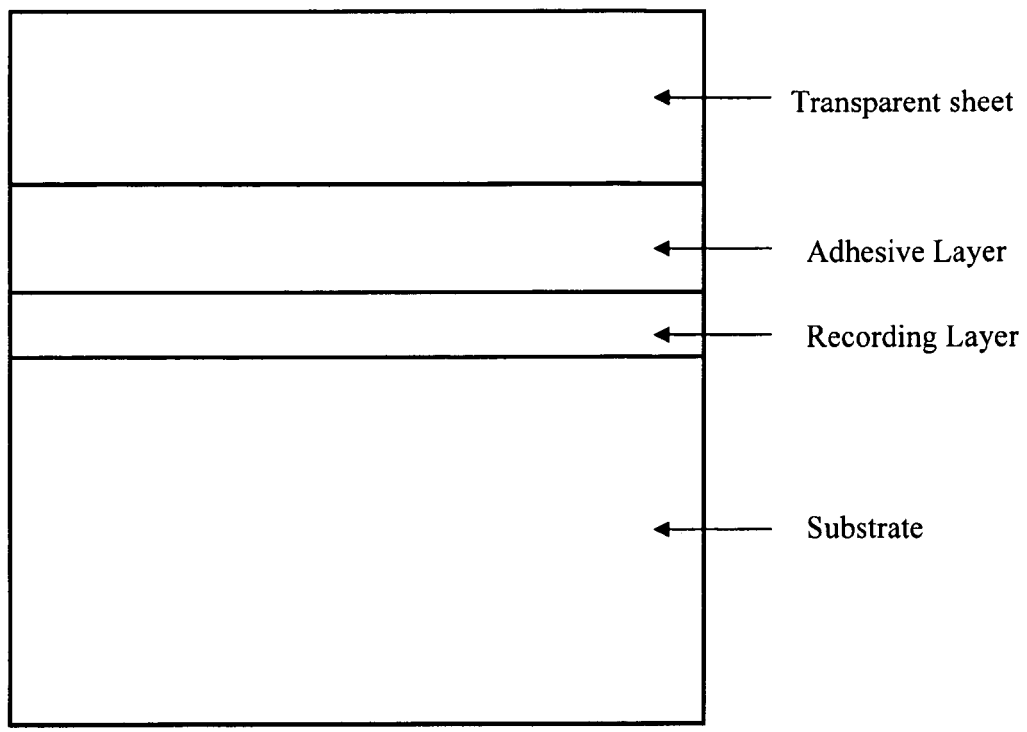

OPTICAL INFORMATION RECORDING MEDIUM

CROSS-REFERENCE TO RELATED APPLICATION

This application claims priority under 35USC 119 from Japanese Patent Application No. 2003-34763, the disclosure of which is incorporated by reference herein.

BACKGROUND OF THE INVENTION

1. Field of the Invention

The present invention relates to an optical information recording medium and particularly to a heat mode optical information recording medium.

2. Description of the Related Art

An optical information recording medium (such as DVD) has been required to have a further increased recording density for use in recording and playing-back a large amount of character information, image information and audio information. Particularly for use in picture recording of digital high-vision TV signals, studies are being carried out to provide an optical information recording medium having a higher recording density.

Under such circumstances, a blue-violet laser has been developed, and development of an optical disk system using the blue-violet laser and a high-NA pickup is now being studied. In "ISOM 2000", Sony Corporation presented the DVR-Blue system, which uses a phase change recording medium using the blue-violet laser. The phase change recording medium of the DVR-Blue system has a layered structure which is characterized by having a 0.1 mm-thick transparent layer, called a cover layer, on a laser beam incident side thereof.

Some methods have been proposed for the formation of the 0.1 mm-thick transparent layer, including, for example, a process of bonding a transparent sheet via an adhesive layer such as an ultraviolet curable resin layer and a pressure-sensitive adhesive layer (for example, see Japanese Patent Application Laid-Open (JP-A) Nos. 2000-285520, 2002-8265 and 2000-67468).

The optical information recording medium is used for TV picture recording, data storage in personal computers and the like. In many cases, the medium is used at room temperature.

In some cases, however, the interior of the drive actually has a high temperature due to the heat generated by the device itself. Particularly during continuous operation for a long time, the interior of the drive may have a temperature of 40° C. or higher. The optical disk is inevitably influenced by such a change in temperature during recording and playing-back. Therefore, reduction of a change in characteristics due to temperature change is required.

Phase change materials and organic dyes generally used for recording materials are stable and undergo little change in physical properties at a temperature from room temperature to about 100° C. In contrast, many of the ultraviolet curable resins and the pressure-sensitive adhesives for use in bonding the cover layer have a glass transition point (Tg) in a range from room temperature to about 100° C., and the adhesive layer can often undergo a change in a physical property (hardness) as the temperature increases. If the physical property changes within the temperature range of an environment in which the recording medium is used, the recording characteristics can also change within the temperature range so that stable recording and playing-back characteristics cannot be attained. In the case of some recordable (non-rewritable) optical information recording media (such as DVD-R) using an organic dye as the recording material, high modulation factor is achieved by using a difference (index of modulation) between the reflectances of an unrecorded portion and a recorded portion, which is produced after the adhesive layer of the recorded portion is deformed. Particularly in such media, if the hardness varies, susceptibility to the deformation can vary, and therefore sensitivity can vary.

SUMMARY OF THE INVENTION

It is therefore an object of the present invention to provide an optical information recording medium that is not influenced by a temperature change in an environment in which the medium is used and always has stable recording and playing-back characteristics.

In order to achieve the above object, the inventors have made active investigations on the type, the physical property and the like of the adhesive layer and finally invented an optical information recording medium that has stable recording and playing-back characteristics in the temperature range for normal use.

One aspect of the present invention is to provide an optical information recording medium, comprising a substrate, a recording layer, an adhesive layer, and a transparent sheet provided in this order, wherein the adhesive layer has a peak of loss modulus at a temperature of 0° C. or lower, and exhibits an $E1'/E2'$ ratio of 2.0 or less, wherein $E1'$ and $E2'$ represent storage moduli of the adhesive layer at 25° C. and 80° C., respectively.

The recording layer preferably contains an organic dye.

BRIEF DESCRIPTION OF THE DRAWING

FIG. 1 is a cross-sectional view of an embodiment of the optical information recording medium of the present invention.

DETAILED DESCRIPTION OF THE INVENTION

The optical information recording medium according to the present invention has a structure including a substrate, a recording layer formed on the substrate, and a transparent sheet provided on the recording layer via an adhesive layer as shown in the FIG. 1.

In such a structure, specifically, a reflective layer, the recording layer, an intermediate layer, and the adhesive layer may be formed in this order on the substrate, and the transparent sheet may be provided on the adhesive layer.

The optical information recording medium according to the invention is described below using such a structure as an example.

<Substrate>

Any material may be selected for use from a variety of materials that have been used as the substrate material for the conventional optical information recording media.

Specific examples of such a material may include glass; polycarbonate; an acrylic resin such as polymethylmethacrylate; a vinyl chloride resin such as poly(vinyl chloride) and a vinyl chloride copolymer; an epoxy resin; amorphous polyolefine; polyester; and a metal such as aluminum. If desired, any combination of these materials may be used.

Of the above materials, polycarbonate and amorphous polyolefine are preferred in terms of moisture resistance, dimensional stability, low cost, and the like, and polycarbonate is particularly preferred. The substrate preferably has a thickness of 0.5 to 1.4 mm.

The substrate is generally formed with a guide groove for tracking or formed with a concavity and a convexity (called a pregroove or groove) for representing the information such as address signals. For the purpose of achieving a higher recording density, it is preferable to use a substrate in which the pregroove is formed at a track pitch narrower than that of CD-R and DVD-R.

Specifically, the pregroove track pitch is preferably from 300 to 600 nm. The pregroove preferably has a depth (groove depth) of 20 to 150 nm.

For the purpose of increasing flatness and adhesive strength, an undercoat layer is preferably formed on the substrate surface on the side where a reflective layer will be formed as described below.

Examples of the material for the undercoat layer include polymer materials such as polymethylmethacrylate, an acrylic acid-methacrylic acid copolymer, a styrene-maleic anhydride copolymer, polyvinyl alcohol, N-methylol acrylamide, a styrene-vinyl toluene copolymer, chlorosulfonated polyethylene, nitrocellulose, poly(vinyl chloride), chlorinated polyolefine, polyester, polyimide, a vinyl acetate-vinyl chloride copolymer, an ethylene-vinyl acetate copolymer, polyethylene, polypropylene, and polycarbonate; and a surface modifier such as a silane coupling agent.

The undercoat layer may be formed by a process including the steps of dissolving or dispersing the above material in a suitable solvent to prepare a coating liquid and then applying the coating liquid to the surface of the substrate by any method of application such as spin coating, dip coating and extrusion coating. The thickness of the undercoat layer is generally from 0.005 to 20 μm, and preferably from 0.01 to 10 μm.

<Reflective Layer>

The reflective layer is made of a light reflecting material that has a high reflectance to a laser beam. The reflectance is preferably 70% or more.

Examples of the light reflecting material having a high reflectance include metals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, and Bi; and metalloids; and stainless steels. One of these light reflecting materials may be used alone, or two or more of these materials may be used in combination or as an alloy.

Preferred examples of the materials include Cr, Ni, Pt, Cu, Ag, Au, Al, and stainless steels. Au, Ag and Al or an alloy thereof are more preferred, and Au and Ag or an alloy thereof are most preferred.

The reflective layer may be formed by vapor-depositing, sputtering or ion-plating the light reflecting material on the substrate (the groove-side surface). The thickness of the reflective layer is preferably from 10 to 300 nm, and more preferably from 50 to 200 nm.

If the recording layer, which is described below, has a sufficiently high reflectance, the reflective layer is not essential.

<Recording Layer>

The recording layer is formed on the groove-side surface of the substrate (or formed on the reflective layer, if the reflective layer is formed on the substrate).

The recording layer may contain an organic dye or a phase change recording material (to form a phase change recording layer). In terms of easiness of clear pit formation and the like, the organic dye-containing layer is preferred.

Examples of the organic dye include a triazole compound, a phthalocyanine compound, a porphyrin compound, an aminobutadiene compound, a merocyanine compound, and a cyanin compound, and at least one of these compounds is preferred. The phthalocyanine compound is preferably at least one of an alkoxy-substituted compound, a sulfonamide-substituted compound, a sulfamoyl-substituted compound, and a sulfonic acid-substituted compound.

Any of the dyes disclosed in JP-A Nos. 04-74690, 08-127174, 11-53758, 11-334204, 11-334205, 11-334206, 11-334207, 2000-43423, 2000-108513, and 2000-158818 may be used in combination.

The recording layer may be formed by a process including the steps of dissolving the recording material of the above dye (the organic compound or the like) or the like together with a binder or the like in a suitable solvent to prepare a recording layer coating liquid, then applying the recording layer coating liquid to the substrate or the reflective layer formed on the substrate to form a coating film, and drying the film. The concentration of the recording material in the recording layer coating liquid is preferably from 0.01 to 15% by mass, more preferably from 0.1 to 10% by mass, further more preferably from 0.5 to 5% by mass, and most preferably 0.5 to 3% by mass.

The recording material and the like may be dissolved by means of ultrasonic treatment, a homogenizer, heating, or the like.

Examples of the solvent for use in preparing the recording layer coating liquid include esters such as butyl acetate, methyl lactate, ethyl lactate, and cellosolve acetate; ketones such as methyl ethyl ketone, cyclohexanone and methyl isobutyl ketone; chlorinated hydrocarbons such as dichloromethane, 1,2-dichloroethane and chloroform; amides such as dimethylformamide; hydrocarbons such as methylcyclohexane; ethers such as tetrahydrofuran, ethyl ether and dioxane; alcohols such as ethanol, n-propanol, isopropanol, and n-butanol diacetone alcohol; a fluoride solvent such as 2,2,3,3-tetrafluoropropanol; and glycol ethers such as ethylene glycol monomethyl ether, ethylene glycol monoethyl ether, and propylene glycol monomethyl ether.

In consideration of the solubility of the recording material for use, one of the above solvents may be used alone, or two or more of the above solvents may be used in combination. Any additive such as an antioxidant, an UV absorber, a plasticizer, and a lubricant may be added to the coating liquid, depending on the purpose.

Examples of the binder for use include a natural organic polymer material such as gelatin, a cellulose derivative, dextran, rosin, and rubber; and a synthetic organic polymer such as a hydrocarbon resin such as polyethylene, polypropylene, polystyrene, and polyisobutylene; a vinyl resin such as poly(vinyl chloride), polyvinylidene chloride, and a poly (vinyl chloride)-poly(vinyl acetate) copolymer; an acrylic resin such as poly(methyl acrylate) and poly(methyl methacrylate); polyvinyl alcohol; chlorinated polyethylene; an epoxy resin; a butyral resin; a rubber derivative; and a initial condensate of a heat-curable resin such as a phenol-formaldehyde resin. If the binder is used in combination as a material for the recording layer, the amount of the binder may be generally from 0.01 to 50 times, and preferably from 0.1 to 5 times as much as the recording material (in terms of mass ratio). The concentration of the recording material in the coating liquid prepared as described above is generally from 0.01 to 10% by mass, and preferably 0.1 to 5% by mass.

Examples of the method of application include a spray method, a spin coating method, a dipping method, a roll coating method, a blade coating method, a doctor roll method, and a screen printing method. The recording layer may be a monolayer or a multilayer. The thickness of the recording layer is generally from 20 to 500 nm, preferably from 30 to 300 nm, and more preferably 50 to 100 nm.

The application can be carried out at a temperature of 23 to 50° C. without a particular problem, preferably at a temperature of 24 to 40° C., and more preferably at a temperature of 25 to 37° C.

Any anti-fading agent may be added to the recording layer to improve its light resistance.

A singlet oxygen quencher is generally used as the anti-fading agent. Any known singlet oxygen quencher as disclosed in publications such as patent specifications may be used.

Examples of such an agent include those disclosed in JP-A Nos. 58-175693, 59-81194, 60-18387, 60-19586, 60-19587, 60-35054, 60-36190, 60-36191, 60-44554, 60-44555, 60-44389, 60-44390, 60-54892, 60-47069, 63-209995, and 04-25492; Japanese Patent Application Publication (JP-B) Nos. 01-38680 and 06-26028; and German Patent No. 350,399. Such an agent is also disclosed in Bulletin of the Chemical Society of Japan (in Japanese), October 1992, p.1141.

The anti-fading agent such as the singlet oxygen quencher is generally used in an amount of 0.1 to 50% by mass, preferably 0.5 to 45% by mass, more preferably 3 to 40% by mass, and particularly preferably 5 to 25% by mass, based on the amount of the recording compound.

Alternatively, the recording layer may be a phase change recording layer. The phase change recording layer is made of a material that can repeat phase change between a crystal phase and an amorphous phase by radiation of a laser beam.

For example, such phase change between the crystal phase and the amorphous phase may be repeated by the following process: In the process of recording information, a concentrated laser beam pulse is radiated for a short time so as to partially melt the phase change recording layer; The melted portion is rapidly cooled by thermal diffusion and solidified to form an amorphous record mark; In the process of erase, a laser beam is radiated to the record mark to heat it at a temperature not higher than the melting point of the recording layer and not lower than the crystallization temperature, and then slow cooling is applied, so that the amorphous record mark is crystallized to return to the unrecorded state.

Examples of the material for forming the phase change recording layer include an Sb—Te alloy, a Ge—Sb—Te alloy, a Pd—Ge—Sb—Te alloy, a Nb—Ge—Sb—Te alloy, a Pd—Nb—Ge—Sb—Te alloy, a Pt—Ge—Sb—Te alloy, a Co—Ge—Sb—Te alloy, an In—Sb—Te alloy, a Ag—In—Sb—Te alloy, a Ag—V—In—Sb—Te alloy, and a Ag—Ge—In—Sb—Te alloy. In particular, the Ge—Sb—Te alloy and the Ag—In—Sb—Te alloy are preferred because they allow rewriting many times.

The thickness of the phase change recording layer is preferably from 10 to 50 nm, and more preferably from 15 to 30 nm.

The phase change recording layer may be formed by any vapor-phase thin film deposition process such as sputtering and vacuum deposition, or the like.

<Intermediate Layer>

The intermediate layer is an optional layer that is provided between the recording layer and the adhesive layer, which is described below. If the adhesive layer is formed directly on the recording layer, the adhesive or pressure-sensitive adhesive of the adhesive layer might dissolve the organic substance of the recording layer. In such a case, the intermediate layer may be formed to avoid direct contact between the adhesive or the like and the recording layer. Thus, the recording layer can be prevented from being dissolved by the adhesive or the pressure-sensitive adhesive.

The thickness of the intermediate layer is preferably from 1 to 300 nm, and more preferably 3 to 110 nm.

Any material that is transparent to a laser beam may be used without limitation to form the intermediate layer, however a dielectric material is preferably used. Specific examples of such a material include inorganic oxides, nitrides and sulfides such as $ZnS$, $TiO_2$, $SiO_2$, $ZnS$—$SiO_2$, $GeO_2$, $Si_3N_4$, $Ge_3N_4$ and $MgF_2$, and $ZnS$—$SiO_2$ or $SiO_2$ is particularly preferred.

<Adhesive Layer and Transparent Sheet>

The transparent sheet is provided to protect the inside of the optical information recording medium from chemical or physical change.

The transparent sheet is provided on the recording layer or the intermediate layer via the adhesive layer comprising an adhesive or a pressure-sensitive adhesive.

In the invention, the adhesive layer for fixing the transparent sheet has a peak of loss modulus at a temperature of 0° C. or lower (the temperature at which loss modulus has its peak is sometimes referred to as "peak temperature" hereinafter). If the peak temperature is higher than 0° C., the deformation of the adhesive layer can be small in the process of recording so that the modulation factor can be too small. For the purpose of achieving a high modulation factor, the peak temperature is preferably from −50 to −15° C., and more preferably from −40 to −25° C.

In addition, the $E1'/E2'$ ratio (hereinafter referred to as "storage modulus ratio") is 2.0 or less, wherein $E1'$ represents a storage modulus of the adhesive layer at 25° C. and $E2'$ represents a storage modulus of the adhesive layer at 80° C. If the storage modulus ratio is more than 2.0, the difference between the storage moduli at 25° C. and at 80° C. can be so large that the amount of the deformation of the adhesive layer can vary in the process of recording and that the recording suitability may be varied. For the purpose of achieving less variation of the recording suitability, the storage modulus ratio is preferably 1.5 or less, and more preferably 1.0 or less.

As described above, the peak temperature and the storage modulus ratio are each set within the above-defined range, so that the optical information recording medium is not influenced by a temperature change under service conditions and can always have stable recording and playing-back characteristics.

In a preferred manner, the peak temperature and the storage modulus ratio can be set within the above-defined ranges by using an adhesive or pressure-sensitive adhesive having such physical properties for the adhesive layer. In terms of productivity and durability, it is more preferable to use the pressure-sensitive adhesive.

The adhesive for use is preferably an ultraviolet curable resin or the like.

Examples of the pressure-sensitive adhesive include acrylic adhesives, rubber adhesives and silicone adhesives. The acrylic adhesive is preferably used in terms of easiness of polymer design, durability and adhesion to the transparent sheet.

The acrylic pressure-sensitive adhesive may comprise a main monomer that imparts stickiness, a copolymerizable monomer (comonomer) that imparts internal cohesiveness, and a functional monomer that provides crosslinking points and contributes to the adhesion, as main components, and optionally comprise a crosslinking agent for increasing the cohesion and other components.

Examples of the main monomer include ethyl acrylate, butyl acrylate, 2-ethylhexyl acrylate, isooctyl acrylate, and isononyl acrylate.

Examples of the comonomer include vinyl acetate, acrylonitrile, acrylamide, styrene, methyl methacrylate, and methyl acrylate.

Examples of the functional monomer include an unsaturated monobasic acid such as methacrylic acid and acrylic acid, an unsaturated dibasic acid such as itaconic acid, hydroxyethyl methacrylate, hydroxypropyl methacrylate, dimethylaminoethyl methacrylate, acrylamide, methylolacrylamide, glycidyl methacrylate, and maleic anhydride.

In some cases, the adhesive may comprise different main monomers with neither comonomer nor functional monomer.

An epoxy or isocyanate crosslinking agent or the like may be used as needed. Such a crosslinking agent is preferably added in an amount of 0.1 to 10 parts by mass based on 100 parts by mass of the acrylic copolymer.

The acrylic copolymer produced from the monomers preferably comprises 30 to 90% by mass of the main monomer, 30 to 90% by mass of the comonomer, and 0.1 to 10% by mass of the functional monomer. The acrylic pressure-sensitive adhesive can be produced by adding the isocyanate crosslinking agent or the like to the acrylic copolymer. The acrylic copolymer preferably has an average molecular weight of 10,000 to 150,000 before crosslinking.

The acrylic copolymer having the above composition and an average molecular weight in the above range can form a pressure-sensitive adhesive. The adhesive layer having the desired storage modulus ratio and the desired peak temperature can be made of such a pressure-sensitive adhesive.

The process described below may be used to determine whether the adhesive or the pressure-sensitive adhesive has the desired storage modulus ratio and the desired peak temperature.

First, the adhesive coating liquid or the pressure-sensitive adhesive coating liquid (or an UV curable agent) is cast with a thickness of about 50 μm to about 80 μm on a transparent sheet having no glass transition point (Tg) in the measurement temperature range (for example, from about −50° C. to about 100° C.) (for example, a polyethylene terephthalate film with a thickness of 7 μm).

The coating is dried at a temperature of 50 to 60° C. for several hours and then allowed to stand in a drying machine at 40° C. for three days to undergo crosslinking. When the UV curable agent is used, the agent is dried at a temperature of 50 to 60° C. for several hours, and then the transparent sheet is laminated and irradiated with light from an ultraviolet lamp.

The same transparent sheet is then laminated on the crosslinked pressure-sensitive adhesive to form a three-layer film in which the adhesive or the pressure-sensitive adhesive is sandwiched.

The resulting film is cut into a certain size (for example, 5 cm long×3 mm wide) and measured for storage moduli at 25° C. ($E1'$) and at 80° C. ($E2'$) using an automatic dynamic viscoelastometer (such as RHEOVIBRON DDV-II-EA, manufactured by Toyo Baldwin, Co., Ltd.), and then a storage modulus ratio ($E1'/E2'$) is calculated. The meter is also used to determine the temperature at the peak of the loss modulus.

When an adhesive is used to form the adhesive layer, the process may include the steps of first applying the adhesive to the surface to be bonded to the transparent sheet, for example, applying it to the recording layer; then laminating the transparent sheet; and performing spin coating so that the transparent sheet is fixed onto the laminating surface.

When the pressure-sensitive adhesive is alternatively used to form the adhesive layer, the process may include the step of laminating the pressure-sensitive adhesive-coated transparent sheet on the laminating surface.

The thickness of the adhesive layer is preferably from 5 to 50 μm, and more preferably from 10 to 30 μm.

Any transparent material may be used for the transparent sheet without limitation. Such a transparent material is preferably polycarbonate, cellulose triacetate or the like and more preferably has a hygroscopic coefficient of 5% or less at 23° C. and 50% RH.

The thickness of the transparent layer is preferably from 50 to 95 μm, and more preferably from 70 to 90 μm. If the transparent layer has a thickness of less than 50 μm, the adhesive layer can be relatively thick so that uniform application of the adhesive may be difficult and that the thickness unevenness can fail to meet the standard ±3 μm. If the transparent layer has a thickness of more than 95 μm, it may be difficult to meet the thickness standard for the cover layer (100 μm).

The term "transparent" means that the matter is transparent in such a degree that the matter can transmit the recording laser beam and the playing-back laser beam (at a transmittance of 90% or more).

A method of recording information on the optical information recording medium of the invention and a method of playing-back the recorded information are described below.

For example, information is recorded on the optical information recording medium as shown below.

First, while the optical information recording medium is rotated at a constant linear speed, a recording laser beam with a wavelength of 500 nm or less is radiated from the transparent sheet side.

In the case that the recording layer contains a dye, the recording layer absorbs the radiated laser beam, which locally increases the temperature to cause physical or chemical change (for example, to form pits). As a result, the optical characteristics of the layer are changed, so that the information is recorded.

In the case that the recording layer contains the phase change recording material, information is recorded by a process including the steps of radiating a laser beam and applying rapid cooling so that crystallographic phase change (a change from the crystal state to the amorphous state) occurs in the irradiated portion.

Examples of the laser beam source having an oscillation wavelength of 500 nm or less include a blue-violet semiconductor laser having an oscillation wavelength of 390 to 415 nm and a blue-violet SHG laser having a central oscillation wavelength of about 430 nm.

For the purpose of increasing the recording density, the numerical aperture (NA) of the objective lens for use in the pickup is preferably 0.7 or higher, and more preferably 0.85 or higher.

On the other hand, the recorded information can be played back by a process including the steps of radiating, from the transparent sheet side, a laser beam with a wavelength equal to or shorter than the wavelength used in the recording information while the optical information recording medium is rotated at the above same constant linear speed and detecting a beam reflected therefrom.

EXAMPLES

The present invention is described in more detail by showing the examples below. However, such examples should not be construed to limit the scope of the invention.

Example 1

(Preparation of Transparent Sheet with Pressure-Sensitive Adhesive)

1) Liquid Preparation

The acrylic copolymer A (in a solvent of ethyl acetate/toluene=1/1, hereinafter in the same ratio) and an isocyanate crosslinking agent (in a solvent of ethyl acetate/toluene=1/1, hereinafter in the same ratio) were mixed in a ratio of 100:1 (by mass) to produce a pressure-sensitive adhesive coating liquid A.

The composition of the acrylic copolymer A is as shown in Table 1 below. Table 1 also shows the acrylic copolymers B to E used in the examples and the comparative examples below.

TABLE 1

|  | Main Monomer | (% by mass) | Comonomer | (% by mass) | Functional Monomer | (% by mass) |
|---|---|---|---|---|---|---|
| Acrylic Copolymer A | n-Butyl Acrylate/ 2-Ethylhexyl Acrylate | 40/30 | Methyl Acrylate | 25 | Acrylic Acid, Methacrylic Acid | 5 |
| Acrylic Copolymer B | n-Butyl Acrylate/ 2-Ethylhexyl Acrylate | 30/30 | Methyl Acrylate | 35 | Acrylic Acid, Methacrylic Acid | 5 |
| Acrylic Copolymer C | n-Butyl Acrylate/ 2-Ethylhexyl Acrylate | 25/25 | Methyl Acrylate | 45 | Acrylic Acid, Methacrylic Acid | 5 |
| Acrylic Copolymer D | n-Butyl Acrylate/ 2-Ethylhexyl Acrylate | 50 | Vinyl Acetate | 45 | Acrylic Acid, Methacrylic Acid | 5 |
| Acrylic Copolymer E | n-Butyl Acrylate/ 2-Ethylhexyl Acrylate | 50 | Vinyl Acetate | 49 | Acrylic Acid, Methacrylic Acid | 1 |

2) Application, Drying and Winding

While a polyethylene separator film was fed from a roll, the pressure-sensitive adhesive coating liquid A was continuously applied to the separator film so as to have a dry thickness of 20 μm. Immediately after the coating was dried in a drying zone (at 100° C.), the pressure-sensitive adhesive surface of the separator film was laminated on the polycarbonate surface of a fed polycarbonate film (Pure-Ace, manufactured by Teijin Ltd., 80 μm in thickness, with one side provided with a separator film), and the films were wound together into a roll. The wound films were held at 23° C. and 50% RH for 72 hours.

3) Punching and Horizontal Holding

The polycarbonate film laminated with the separator film was punched out in the same form as that of the substrate for the optical information recording medium to be prepared, to form a transparent sheet for use in the optical information recording medium.

(Preparation of Optical Information Recording Medium)

A substrate of an injection-molded polycarbonate resin (trade name: Panlite AD5503, manufactured by Teijin Chemicals Ltd.) was used, which was 1.1 mm in thickness and 120 mm in diameter and had a spiral groove (depth: 100 nm, width: 120 nm, track pitch: 320 nm). Ag was sputtered on the groove-side surface of the substrate to form a reflective layer with a thickness of 100 nm.

A phthalocyanine dye A (trade name: Orasol blue GN, manufactured by Ciba Specialty Chemicals Inc.) was added to 2,2,3,3-tetrafluoropropanol and dissolved by ultrasonic treatment for two hours so that a dye coating liquid was prepared. The dye coating liquid was applied by spin coating onto the reflective layer under the conditions of 23° C. and 50% RH, while the rotation speed was altered from 300 rpm to 4,000 rpm. Thus, a recording layer was formed with a thickness of 80 nm.

After the recording layer was held at 23° C. and 50% RH for one hour, ZnS—SiO$_2$ was sputtered on the recording layer to form an intermediate layer with a thickness of 5 nm.

After the intermediate layer was formed, the separator film was peeled off from the above produced transparent sheet with the pressure-sensitive adhesive, and then the transparent sheet was laminated on the intermediate layer using roller pressing means, so that an optical information recording medium was prepared.

Example 2

A transparent sheet and an optical information recording medium were produced in the same manner as in Example 1 except that the acrylic copolymer B (in a solvent of ethyl acetate/toluene) and an isocyanate crosslinking agent (in a solvent of ethyl acetate/toluene) were mixed in a ratio of 100:1 (by mass) to produce a pressure-sensitive adhesive coating liquid B and that the coating liquid B was used in place of the coating liquid A.

Example 3

A transparent sheet and an optical information recording medium were produced in the same manner as in Example 1 except that the acrylic copolymer C (in a solvent of ethyl acetate/toluene) and an isocyanate crosslinking agent (in a solvent of ethyl acetate/toluene) were mixed in a ratio of 100:1 (by mass) to produce a pressure-sensitive adhesive coating liquid C and that the coating liquid C was used in place of the coating liquid A.

Example 4

A substrate of an injection-molded polycarbonate resin (trade name: Panlite AD5503, manufactured by Teijin Chemicals Ltd.) was used, which was 1.1 mm in thickness and 120 mm in diameter and had a spiral groove (land height: 40 nm, width: 120 nm, track pitch: 0.3 μm). A reflective layer (Ag, 100 nm in thickness), a lower heat-resistant protective layer (ZnS—SiO$_2$, 170 nm in thickness), a recording layer (AgInSbTe, 25 nm in thickness), and an upper heat-resistant protective layer (ZnS—SiO$_2$, 35 nm in thickness) were formed by sputtering in this order on the groove-side surface of the substrate.

Thereafter, the transparent sheet with the pressure-sensitive adhesive produced in Example 1 was laminated thereon using roller pressing means.

Comparative Example 1

A transparent sheet and an optical information recording medium were produced in the same manner as in Example 1 except that the acrylic copolymer D (in a solvent of ethyl acetate/toluene) and an isocyanate crosslinking agent (in a solvent of ethyl acetate/toluene) were mixed in a ratio of 100:1 (by mass) to produce a pressure-sensitive adhesive coating liquid D and that the coating liquid D was used in place of the coating liquid A.

Comparative Example 2

A transparent sheet and an optical information recording medium were produced in the same manner as in Example 1 except that the acrylic copolymer E (in a solvent of ethyl acetate/toluene) and an isocyanate crosslinking agent (in a solvent of ethyl acetate/toluene) were mixed in a ratio of 100:1 (by mass) to produce a pressure-sensitive adhesive coating liquid E and that the coating liquid E was used in place of the coating liquid A.

Comparative Example 3

A transparent sheet and an optical information recording medium were produced in the same manner as in Example 1 except that the acrylic copolymer E (in a solvent of ethyl acetate/toluene) and an isocyanate crosslinking agent (in a solvent of ethyl acetate/toluene) were mixed in a ratio of 100:1 (by mass) to produce a pressure-sensitive adhesive coating liquid E and that the coating liquid E was used in place of the coating liquid A and curing was performed at a temperature about 30° C. higher than that in Comparative Example 2.

Comparative Example 4

A substrate of an injection-molded polycarbonate resin (trade name: Panlite AD5503, manufactured by Teijin Chemicals Ltd.) was used, which was 1.1 mm in thickness and 120 mm in diameter and had a spiral groove (depth: 100 nm, width: 120 nm, track pitch: 320 nm). Ag was sputtered on the groove-side surface of the substrate to form a reflective layer with a thickness of 100 nm.

The phthalocyanine dye A (trade name: Orasol blue GN, manufactured by Ciba Specialty Chemicals Inc.) was mixed with 2,2,3,3-tetrafluoropropanol and dissolved by ultrasonic treatment for two hours so that a dye coating liquid was prepared. The dye coating liquid was applied by spin coating onto the reflective layer under the conditions of 23° C. and 50% RH, while the rotation speed was altered from 300 rpm to 4,000 rpm. Thus, a recording layer was formed.

After the recording layer was held at 23° C. and 50% RH for one hour, $ZnS$—$SiO_2$ was sputtered on the recording layer to form an intermediate layer with a thickness of 5 nm.

An UV curable adhesive (SD-347, manufactured by Dainippon Ink and Chemicals, Inc., with a solubility of 0.05% by weight in the dye) was applied by spin coating onto the intermediate layer at a rotation speed of 100 to 300 rpm. A polycarbonate sheet (trade name: Pure-Ace, a polycarbonate sheet, manufactured by Teijin Ltd., 0.07 mm in thickness) was laminated thereon. While the rotation speed was altered from 300 rpm to 4,000 rpm, the adhesive was spread over the whole surface. Thereafter, ultraviolet light was radiated from an UV lamp to cure the adhesive, so that a cover layer comprising the transparent sheet was formed. An UV curable adhesive (Daicure SD-661, manufactured by Dainippon Ink and Chemicals, Inc.) was further applied onto the cover layer by spin coating at a rotation speed of 100 to 300 rpm. Thereafter, while the rotation speed was altered from 300 rpm to 4,000 rpm, the adhesive was spread over the whole surface. Ultraviolet light was then radiated from an UV lamp to cure the adhesive, so that an optical information recording medium was prepared. Information is recorded on and played back from the groove portion (which is dented against the cover layer side).

The optical information recording media prepared in Examples 1 to 4 and Comparative Examples 1 to 4 were each measured for the storage modulus and loss modulus of the adhesive layer. The characteristics of each optical information recording medium were also evaluated (measurement of a carrier/noise ratio).

The results are shown in Table 2 below.

The methods as shown below were used to measure the storage modulus and the loss modulus and to evaluate the characteristics.

1) Method for Measuring Storage Modulus of Adhesive Layer

Measuring apparatus: Automatic Dynamic Viscoelastometer RHEOVIBRON DDV-II-EA (Toyo Baldwin, Co., Ltd.)
Measuring frequency: 110 HZ
Measuring temperature range: −100° C. to 100° C.
Rate of temperature rise: 2° C./min.
Method of preparing samples to be measured:

(1) Each of the pressure-sensitive adhesive coating liquids A to E (the UV curable adhesive in the case of Comparative Example 4) was cast with a thickness of about 50 μm on a thin layer film having no glass transition point (Tg) in the measurement temperature range (specifically, a polyethylene terephthalate film with a thickness of 7 μm).

(2) The coating was dried at 50° C. for two hours and then allowed to stand in a dry atmosphere at 40° C. for three days to undergo crosslinking. The UV curable adhesive (in the case of Comparative Example 4) was dried at 50° C. for two hours, and then the same film was laminated and irradiated with ultraviolet light from an ultraviolet lamp.

(3) The same thin layer film as that in the process (1) was then laminated on the crosslinked pressure-sensitive adhesive (the UV cured adhesive in the case of Comparative Example 4) to produce a three-layer film in which the pressure-sensitive adhesive or the UV cured adhesive was sandwiched.

(4) The resulting film from the process (3) was cut into a predetermined size (5 cm long×3 mm wide) and measured for storage moduli at 25° C. (E1') and at 80° C. (E2') using the above measuring apparatus, and then a storage modulus ratio (E1'/E2') was calculated. The temperature at the peak of the loss modulus was also determined at the same time.

2) Evaluation of Disk Characteristics

In the evaluation of the disk characteristics, a carrier/noise ratio (C/N) was measured under each of two conditions: a room temperature condition (25° C., 50% RH) and a high temperature condition (45° C., 20% RH) by the method as shown below.

Single-frequency signals (2T=0.13 μm) were recorded on and played back from the prepared optical information recording medium at a clock frequency of 66 MHz and at a linear velocity of 5.6 m/s in a recording/playing-back evaluation machine (DDU1000, manufactured by Pulstec Industrial Co., Ltd.) equipped with a 405 nm laser and a pickup with an NA of 0.85, and C/N was measured in a spectrum analyzer.

TABLE 2

| | E" Peak Temperature (° C.) | E1'/E2' (–) | C/N at 25° C., 50% RH (dB) | C/N at 45° C., 20% RH (dB) |
|---|---|---|---|---|
| Example 1 | –30 | 1.2 | 52 ○ | 51 ○ |
| Example 2 | –5 | 1.3 | 51 ○ | 50 ○ |
| Example 3 | –5 | 1.9 | 51 ○ | 49 △ |
| Example 4 | –30 | 1.2 | 51 ○ | 50 ○ |
| Comparative Example 1 | 5 | 1.3 | 40 X | 39 X |
| Comparative Example 2 | –5 | 2.2 | 51 ○ | 39 X |
| Comparative Example 3 | 5 | 2.2 | 41 X | 39 X |
| Comparative Example 4 | 10 | 2.1 | 39 X | 39 X |

The above results show that each of the optical information recording media of Examples 1 to 4 exhibits good disk characteristics regardless of operating temperature, because the temperature for the peak of loss modulus of the adhesive layer and the storage modulus ratio (E1'/E2') are each set within the predetermined range.

As described above, the optical information recording medium according to the invention is not influenced by a temperature change under service conditions and can always have stable recording and playing-back characteristics.

What is claimed is:

1. An optical information recording medium, comprising a substrate, a recording layer, an adhesive layer, and a transparent sheet provided in this order,
   wherein the adhesive layer has a peak of loss modulus at a temperature of 0° C. or less, and exhibits an E1'/E2' ratio of 2.0 or less, wherein E1' and E2' represent storage moduli of the adhesive layer at 25° C. and 80° C., respectively.

2. The optical information recording medium of claim 1, wherein the recording layer contains an organic dye.

3. The optical information recording medium of claim 1, further comprising a reflective layer between the substrate and the recording layer.

4. The optical information recording medium of claim 1, further comprising an intermediate layer between the recording layer and the adhesive layer.

5. The optical information recording medium of claim 1, wherein the adhesive layer has the peak of loss modulus at a temperature of –50° C. to –15° C.

6. The optical information recording medium of claim 1, wherein the adhesive layer has the peak of loss modulus at a temperature of –40° C. to –25° C.

7. The optical information recording medium of claim 1, wherein the adhesive layer exhibits the E1'/E2' ratio of 1.5 or less, wherein E1' and E2' represent storage moduli of the adhesive layer at 25° C. and 80° C., respectively.

8. The optical information recording medium of claim 1, wherein the adhesive layer exhibits the E1'/E2' ratio of 1.0 or less, wherein E1' and E2' represent storage moduli of the adhesive layer at 25° C. and 80° C., respectively.

9. The optical information recording medium of claim 1, wherein the adhesive layer contains an ultraviolet curable resin and wherein the ultraviolet curable resin satisfies the peak of loss modulus and the E1'/E2' ratio of claim 1 when cured.

10. The optical information recording medium of claim 1, wherein the adhesive layer comprises an acrylic pressure-sensitive adhesive and wherein the acrylic pressure-sensitive adhesive satisfies the peak of loss modulus and the E1'/E2' ratio of claim 1 when the acrylic pressure-sensitive adhesive is cured.

11. The optical information recording medium of claim 10, wherein the acrylic pressure-sensitive adhesive comprises an acrylic copolymer and an isocyanate crosslinking agent.

12. The optical information recording medium of claim 11, wherein the acrylic copolymer comprises 30 to 90% by mass of a main monomer, 30 to 90% by mass of a comonomer, and 0.7 to 10% by mass of a functional monomer.

13. The optical information recording medium of claim 11, wherein the acrylic complymer has an average molecular weight of 10,000 to 150,000 before crosslinking.

* * * * *